United States Patent [19]

Addesso et al.

[11] Patent Number: 5,429,834
[45] Date of Patent: Jul. 4, 1995

[54] PRODUCTION OF CHIP-LIKE STARCH BASED SNACKS

[75] Inventors: Kevin Addesso, Ringwood; Theresa E. Dzurenko, Morris Plains, both of N.J.; Mark J. Moisey, Center Valley, Pa.; Harry Levine; Louise Slade, both of Morris Plains, N.J.; James M. Manns, Glenwood, N.J.; Richard D. Fazzolare, Randolph, N.J.; James Ievolella, New City, N.Y.; Martha Y. Wang, Glen Rock, N.J.

[73] Assignee: Nabisco, Inc., Parsippany, N.J.

[21] Appl. No.: 57,918

[22] Filed: May 7, 1993

[51] Int. Cl.⁶ .................... A23L 1/10; A23L 1/217
[52] U.S. Cl. ........................... 426/549; 426/578; 426/808
[58] Field of Search ................ 426/549, 578, 808

[56] References Cited

U.S. PATENT DOCUMENTS

| 678,749 | 7/1901 | Moore et al. |
| 1,039,912 | 10/1912 | Dollings |

(List continued on next page.)

FOREIGN PATENT DOCUMENTS

| 637258 | 2/1962 | Canada. |
| 2267049 | 11/1975 | France. |
| 2604716 | 8/1976 | Germany. |
| 54-32056 | 10/1979 | Japan. |
| 55-108250 | 8/1980 | Japan. |
| 59-031642 | 2/1984 | Japan. |
| 60-168361 | 8/1985 | Japan. |
| 60-244256 | 12/1985 | Japan. |
| 61-202658 | 9/1986 | Japan. |
| 107218 | 6/1917 | United Kingdom. |
| 1525631 | 9/1978 | United Kingdom. |
| 2111816 | 7/1983 | United Kingdom. |
| 370933 | 11/1973 | U.S.S.R. |

OTHER PUBLICATIONS

Roy J. Whistler, James N. Bemiller, Eugene F. Paschall, Starch: Chemistry and Technology, Academic Press, Inc. 1984, pp. 588–590.

Chemical Abstract #58556d of 17–Foods vol. 80, 1974.
Tressler, Donald K., Ph.D., Food Products Formulary, vol. 2, Cereals, Baked Goods, Dairy and Egg Products, The AVI Publ. Co., Westport, Conn., pp. 103–104 (1975).
"Low-Calorie, Baked Snack . . . Potato Rips", Engineered Foods Magazine, p. 58 (Aug. 8, 1984).
Pyler, E. J., "Baking Science and Technology", Siebel Publ. Co., Chicago, Ill., 1973, pp. 428–429.
Matz, S. A., Cookie and Cracker Technology, The AVI Publ. Co., Chapter 18, pp. 238–253 (1968).
Matz, S. A., Cookie and Cracker Technology, The AVI Publ. Co., pp. 265–266 (1968).
Pyler, E. J., Baking Science & Technology, Sosland Publishing Co., Merriam, Kans., 1988, pp. 1061–1062, 913 and 609.
Foods and Food Production Encyclopedia, Van Nostrand Reinhold Co., Inc., NY, N.Y., 1982 pp. 282–284.
Pesrosier, N. W., Elements of Food Technology, AVI Publ. Co., inc. Wesport, Conn., 1977 pp. 479–482 & 468–469.
Kotschevar, L. H., Standards, Principles, and Techniques in Quality Food Production, Van Nostrad Reinhold, New York, N.Y., 1988, pp. 404–407.

Primary Examiner—Jeanette Hunter
Assistant Examiner—Mary S. Mims

[57] ABSTRACT

A pregelatinized waxy starch provides for the production of cohesive, continuously machineable doughs from starchy materials or ingredients having starch with no- or low-gluten contents. The pregelatinized waxy starch is admixed with only a portion of the at least one starchy material and only a portion of the water needed to form a machineable dough. This mixing procedure results in uniform hydration of the pregelatinized waxy starch and avoids tearing of the dough sheet during machining. The moisture content of the dough sheets is reduced substantially from above about 25% by weight by heating in air, preferably in a gas-fired oven, to obtain chip-like snacks, such as potato chips and corn chips, having a low oil content, a blistered appearance, and a crisp texture.

28 Claims, No Drawings

U.S. PATENT DOCUMENTS

| | | |
|---|---|---|
| 1,169,023 | 1/1916 | Embrey . |
| 1,975,326 | 10/1934 | Loose et al. . |
| 2,204,045 | 6/1940 | Meacham . |
| 2,505,407 | 4/1950 | Johnson . |
| 2,767,667 | 10/1956 | Spooner . |
| 3,276,397 | 10/1966 | Poppe et al. . |
| 3,332,781 | 7/1967 | Benson et al. . |
| 3,348,950 | 10/1967 | Weiss . |
| 3,384,495 | 5/1968 | Potter et al. . |
| 3,451,822 | 6/1969 | Fast et al. . |
| 3,600,193 | 8/1971 | Glabe . |
| 3,615,658 | 10/1972 | Glabe . |
| 3,615,697 | 10/1972 | Hollenbeck . |
| 3,652,294 | 3/1972 | Marotta et al. . |
| 3,698,914 | 10/1972 | Kortschot et al. . |
| 3,698,915 | 10/1972 | Glasgow . |
| 3,753,729 | 8/1973 | Harms et al. . |
| 3,753,735 | 8/1973 | Gerkens . |
| 3,800,050 | 3/1974 | Popel . |
| 3,821,441 | 6/1974 | Tomita et al. . |
| 3,860,735 | 1/1975 | Hoshino . |
| 3,873,748 | 3/1975 | Schwab et al. . |
| 3,922,370 | 11/1975 | Prakash . |
| 3,925,567 | 12/1975 | Abe . |
| 3,935,322 | 1/1976 | Weiss et al. . |
| 3,937,848 | 2/1976 | Campbell et al. . |
| 3,982,032 | 9/1976 | Koizumi . |
| 4,044,166 | 8/1977 | Koizumi . |
| 4,073,958 | 2/1978 | Abe . |
| 4,126,706 | 11/1978 | Hilton . |
| 4,163,804 | 8/1979 | Meyer et al. . |
| 4,208,476 | 6/1980 | Tsao . |
| 4,266,920 | 5/1981 | Hayashi et al. . |
| 4,277,510 | 7/1981 | Wicklund et al. . |
| 4,312,892 | 1/1982 | Rubio . |
| 4,409,250 | 10/1983 | Van Hulle et al. . |
| 4,418,088 | 12/1983 | Cantenot . |
| 4,439,459 | 3/1984 | Swartley . |
| 4,446,163 | 5/1984 | Galle et al. . |
| 4,455,321 | 6/1984 | Glabe . |
| 4,528,202 | 7/1985 | Wang et al. . |
| 4,560,569 | 12/1985 | Ivers . |
| 4,567,051 | 1/1986 | Baker et al. . |
| 4,609,557 | 9/1986 | Mao et al. . |
| 4,615,901 | 10/1986 | Yoshioka et al. . |
| 4,645,679 | 2/1987 | Lee, III et al. . |
| 4,650,687 | 3/1987 | Willard et al. . |
| 4,752,493 | 6/1988 | Moriki . |
| 4,834,996 | 5/1989 | Fazzolare et al. . |
| 4,873,093 | 10/1989 | Fazzolare et al. . |
| 4,880,371 | 11/1989 | Spinelli et al. . |
| 4,931,303 | 6/1990 | Holm et al. . |
| 4,994,295 | 2/1991 | Holm et al. . |

PRODUCTION OF CHIP-LIKE STARCH BASED SNACKS

FIELD OF THE INVENTION

The present invention relates to the production of starch-based snacks having a chip-like texture and appearance.

BACKGROUND OF THE INVENTION

Cohesive, machineable doughs which can be sheeted, stretched, and cut into pieces may be produced at room temperature when the doughs possess a high content of wheat or other gluten containing flour. Starch-based compositions which have little or no gluten, such as potato flour or corn flour, when mixed with water do not form a dough at room temperature that is coherent and continuously machineable or sheetable. Machinability of doughs made from ingredients having little or no gluten may be improved by forming a dough under elevated temperature conditions, such as by steaming the ingredients as disclosed in U.S. Pat. Nos. 4,873,093 and 4,834,996 to Fazzolare et al.

U.S. Pat. Nos. 4,931,303 and 4,994,295 to Holm et al disclose that in the production of fabricated snack products having controlled surface bubbling, the dough sheet must have cohesive properties which permit the surface or surfaces of the dough or preform to stretch relatively uniformly when forming bubbles during frying. The highly cohesive, non-adhesive dough, it is disclosed, can be made by adjusting the quantity of free gelatinized starch, the degree of retrogradation of the starch (thereby affecting the water absorption of a given quantity of the starch) and the concentration of any starch-complexing emulsifiers present. In the Holm et al process, a dough may be formed comprising, e.g. potato solids or corn solids, raw or pre-gelatinized starches, modified starches, flavorings, oils, and the like. For producing potato snacks, the preferred major ingredient in the potato dough is a dehydrated potato flake with high water absorption capability. The dry ingredients are placed in a mixer and blended with water to obtain a dough having a moisture content of from about 30% to about 55% by weight. According to Holm et al, higher moisture content means higher oil absorption during frying. It is further disclosed that doughs containing less than about 30% moisture are generally too dry even after the Holm et al drying step to create adequate bubbles. In the Holm et al process, substantial moisture reduction of the dough is achieved by frying. During frying, the dough moisture content of about 30% to about 55% is reduced to obtain a fried product with a moisture content of about 1-2%.

U.S. Pat. No. 4,560,569 to Ivers discloses that in the production of a dough-based fried food product, a processed starch in either gelatinized or ungelatinized form is frequently added when a low starch flour or flake is employed. Water, it is disclosed, is required to soften the flour, and depending upon the protein content of the flour, to form a network of protein (gluten) which is the framework of the product. According to Ivers starch, which is present in flours, is used as a binder and is required for the unleavened product to expand upon frying. Dough stickiness and hardness of the cooked product may be controlled by the addition of oil to the dough to control the extent of the protein framework. The dough is prepared by adjusting the ratios of components and the mixing time to allow it to sheet uniformly at the desired thickness without sticking or tearing. According to Ivers, addition of a small amount of a lecithin-in-water suspension to the formulation of the dough-based fried snack foods improves the transfer, sheeting and cutting, and significantly reduces clumping during frying without the rapid buildup of free fatty acids and without significant darkening of frying oil normally associated with the frying of foods containing lecithin.

In the present invention, chip-like snacks having a crisp texture and chip-like appearance with blisters distributed over their surfaces are produced from coherent, machineable, sheetable doughs without using a frying step for substantial moisture reduction of the dough thereby resulting in products having low fat content. In addition, a machineable no- or low-gluten content dough may be produced at relatively low temperatures by the use of a pregelatinized waxy starch. When using a pregelatinized waxy starch to improve coherence and machinability of a no- or low-gluten content dough, efficient hydration of the pregelatinized waxy starch is achieved by preliminary mixing with part of the water, while admixing it with a portion of the low- or no-gluten content starchy material to aid dispersion and avoid clumping. The doughs may be sheeted continuously without tearing associated with uneven or non-homogeneous hydration of the pregelatinized starch.

SUMMARY OF THE INVENTION

In embodiments of the present invention a chip-like snack is produced by admixing at least one starchy material or ingredient having starch with water and a functionally compensating level of a pregelatinized waxy starch. However, only a portion of the at least one starchy material and only a portion of the water needed to form a machineable dough are admixed with the matched functional amount of pregelatinized waxy starch to at least substantially uniformly hydrate the pregelatinized waxy starch. The remaining portion of the at least one starchy material and the remaining water are admixed with the premix comprising the hydrated pregelatinized waxy starch to obtain an extensible, machineable dough. When used, uniform hydration of the pregelatinized waxy starch is critical for continuous sheetability of the dough. Use of the pregelatinized waxy starch provides for the production of coherent, extensible, continuously machineable doughs from starchy materials or ingredients having starch with no or low gluten content. The pregelatinized waxy starch and the starchy materials or ingredients having starch with no- or low-gluten content are such so as to provide a tackifier quality or value of at least about 2500, preferably at least about 3000, most preferably from about 3400 to about 4000 g-s. These machineable doughs may be formed at room temperatures without the need for steaming or heat treatment to develop cohesiveness, extensibility, and machinability. The dough-like composition may be machined using conventional cracker dough technology involving dough lamination, dough sheet thickness reduction, and cutting of the dough sheet into pieces.

In embodiments of the present invention, the dough pieces have a moisture content of from about 25% to about 60% by weight, preferably from about 30% by weight to about 50% by weight, more preferably from about 35% by weight to about 43% by weight. The moisture content of the dough pieces is preferably reduced from these high levels to less than about 10% by weight, preferably less than about 5% by weight, most preferably less than about 4% by weight, by baking the pieces. This moisture reduction by baking results in baked pieces having a blistered appearance substantially throughout their surface. In embodiments of the present invention, frying may be performed subsequent to baking. The avoidance of frying for substantial moisture reduction of the dough pieces permits the attainment of crisp, chip-like snacks having a vegetable shortening or oil, or fat content less than 20% by weight of the finished product.

In preferred embodiments of the present invention, a chip-like snack having a texture, taste, and appearance of a potato chip may be produced by admixing pregelatinized waxy maize starch, dehydrated potatoes, and water to substantially, uniformly hydrate the pregelatinized waxy starch and obtain a substantially homogeneous blend wherein the ratio of the functionally compensating amount of pregelatinized waxy starch to the amount of dehydrated potato is from about 0.5 to about 5.0:1. The resulting blend may then be admixed with additional water and additional dehydrated potatoes to obtain a machineable dough having a moisture content of preferably from about 30% by weight to about 50% by weight. The amount of dehydrated potatoes used along with water to obtain uniform hydration of the pregelatinized waxy starch may range up to about 40% by weight, preferably from about 17% by weight to about 23% by weight of the total amount of dehydrated potatoes. The dough may then be laminated upon itself, reduced in thickness to form a thin sheet, and then cut into pieces. The dough pieces are heated to reduce their moisture content and to obtain chip-like products having a blistered appearance and a crisp texture.

DETAILED DESCRIPTION OF THE INVENTION

The gelatinized starch snack foods of this invention may be prepared from conventional starchy materials or ingredients having starch. Commercially available native or modified cereal, root, or leguminous starches, and partially or completely gelatinized starches and ingredients containing them may be used. Preferred embodiments are made from dried or dehydrated potato products such as potato flakes. Desirable alternative embodiments can be made from potato flour, potato granules, corn flour, masa corn flour, corn grits, and corn meal, and other ingredients either used separately or in various combinations. Each of these ingredients has a high starch content, but is absent of gluten. When mixed with water these ingredients have no elasticity because of their lack of gluten. The inability to stretch makes the wet compositions prepared from these ingredients unsuitable for conventional handling and machining as used in cracker technology.

Other starch-containing ingredients can be used in alternative embodiments of this invention. Examples of other non-gluten, starch-containing ingredients include buckwheat flour, rice flour, oat flour, bean flour, such as black bean flour, barley flour, tapioca, and mixtures thereof. Non-gluten, starch-containing ingredients can also be blended with gluten-containing ingredients to vary the flavor and/or texture of the final product. Gluten-containing ingredients which can be used include wheat germ, wheat flour, rye flour, sorghum flour, and graham flour.

Pregelatinized waxy starches or pregelatinized high amylopectin content starches which may be used in the present invention include pregelatinized waxy maize starch, pregelatinized waxy rice starch, pregelatinized waxy barley starch, and mixtures thereof. The preferred pregelatinized waxy starch for achieving coherence, dough extensibility, and dough machinability is a pregelatinized waxy maize starch such as X-Pand'R starch 287C produced by A.E. Staley Manufacturing Company. The pregelatinized waxy starch preferably has a moisture content of less than or equal to about 5.5% by weight and a pH of about 5 to about 6. The particle size distribution of the pregelatinized waxy starch may be less than or equal to about 20% by weight retained on a 50-mesh screen and less than or equal to about 30% passing through a 200-mesh screen. If the particle size is too small, the pregelatinized starch tends to hydrate predominately on the surface. Increasing the particle size of the pregelatinized waxy starch tends to increase its ability to form homogeneous dry blends with the dehydrated potato flakes and reduces its tendency to form lumps. Pregelatinized waxy rice starch may be supplied in the form of a flour produced by Comet Rice Ingredients Co., Los Angeles, Cal.

In the production of potato-based products, continuous dough sheet formation without substantial tearing is obtained by the use of dehydrated potato products having both a high degree of starch gelatinization (as measured by differential scanning calorimetry (DSC)) and a high degree of starch granule disruption. Preferably the DSC profile does not have a peak at 60° C. Generally, starch gelatinization occurs when: a) water in a sufficient amount, generally at least about 30% by weight, based upon the weight of the starch, is added to and mixed with starch and, b) the temperature of the starch is raised to at least about 80° C. (176° F.), preferably 100° C. (212° F.) or more. The gelatinization temperature depends upon the amount of water available for reaction with the starch. The lower the amount of available water, generally, the higher the gelatinization temperature. Gelatinization may be defined as the collapse (disruption) of molecular order within the starch granule manifested in irreversible changes in property such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al, "The Terminology And Methodology Associated With Basic Starch Phenomena," *Cereal Foods World*, Vol. 33, No. 3, pgs. 306–311 (March 1988).

Functionality of the dough depends upon inter alia, availability of the gelatinized starch, and the amylopectin and amylose contents of the dough. Increasing the amylopectin content of a dough tends to result in a soft, coherent dough, film formation, sheet extensibility, puffability upon heating, a crisp texture, and a fragile baked product. Increasing the amylose content of a dough tends to result in a firm, crumbly dough, amylose network formation, increased sheet strength, limited, but maintainable expansion upon heating, a hard crunchy texture, and increased break strength in the baked product.

Starch availability is generally increased by decreased cell wall strength and by particle size reduction. Cell walls are strengthened by precooking and cooling of the potatoes in the presence of sufficient calcium to form calcium pectinate gel during production of the dehydrated potato flakes. When the cell walls of pregelatinized potato flakes are strong, the amylose and the amylopectin are constrained and functionally unavailable. Amylose is constrained by retrogradation during cooling after precooking. As a result of the reduced functionality of the amylose, the functionality of the amylopectin is potentially enhanced. A smaller particle size, achieved by grinding, is needed to release the starch from the strong cell walls. Weak cell walls in pregelatinized potato flakes release starch but also generate fines. Excessive variation in the generation of fines may cause excessive variation in ingredient functionality and may result in stratification during shipping of the ingredient.

In the present invention, the particle size distribution for the dehydrated potato flakes may be less than or equal to about 12% by weight retained on a 20-mesh screen, 25% to 55% by weight retained on a 40-mesh screen, 25% by weight to about 50% by weight retained on an 80-mesh screen, and up to about 30% by weight passing through an 80-mesh screen. Thereby the weight ratio of the amount of potato flakes retained on an 80 mesh screen to the amount retained on a 40 mesh screen is about 0.45–2.0:1.

In the present invention, starch functionality provided by the potato flakes is enhanced when the potato flakes have weak cell walls and the ratio of the weight percent of potato flakes retained on an 80 mesh screen to the weight percent of the potato flakes retained on a 40 mesh screen is about 0.9:1 or more. At these ratios, machinable, coherent doughs can be more readily obtained with improved lamination and sheeting properties. The expansion upon heating is controlled while obtaining a crispy, crunchy textured product with reduced breakage.

In embodiments of the present invention, the starch granules of the dehydrated potato flakes are disrupted and at least about 90% gelatinized, preferably at least about 95% gelatinized, most preferably completely gelatinized. The preferred dehydrated potato product for producing potato-chip like products continuously from a continuous sheeted dough in accordance with the present invention is a ground dehydrated potato product produced from Russet Burbank potatoes grown in Idaho. Dehydrated potato flakes produced from Idaho grown potatoes which may be used can be obtained from Idaho Supreme Potatoes, Inc., Firth, Id. 83236, Idaho Pacific of Ririe, Idaho, Magic Valley Foods, and Nonpareil of Blackfoot, Id. They may be used alone or in combination. For example, Idaho Supreme dehydrated potato flakes having an on 80 mesh:on 40 mesh weight ratio of about 1:1 may be used alone or in combination with other potato flakes having a different on 80 mesh:on 40 mesh ratio, in relative amounts to obtain a particle size distribution within the above-described ranges to provide a tear resistant dough sheet. An exemplary blend which may be used in the present invention may be from about 40 to about 60% by weight of Idaho Supreme potato flakes with the remainder being Idaho Pacific, Nonpareil, Magic Valley Foods, or mixtures thereof. Other potato flakes, such as those produced by McCain Foods of Canada from Russet Burbank potatoes grown in Eastern Canada, may also be used alone or in combination with flakes produced from Idaho grown potatoes.

Exemplary amounts of the pregelatinized waxy starch which may be used in embodiments of the present invention range from 0% by weight to about 40% by weight, preferably from about 17% by weight to about 23% by weight of the total amount of low- or no-gluten content starchy material such as dehydrated potato flakes used in the final dough. The amount used to obtain coherent, sheetable doughs depends, for example, upon the particle size distribution of the dehydrated potato flakes, the pregelatinized waxy starch used, and the amount of water used. Even when highly functional potato flakes are utilized, it is preferable to use at least about 4% by weight of a pregelatinized waxy starch to assure the consistent attainment of coherent, sheetable doughs on a continuous basis.

The amount of water added to produce the machineable doughs of the present invention should be sufficient to provide a moisture content of from about 25% by weight to about 60% by weight, more preferably from about 30% to about 50% by weight, most preferably from about 35% to about 43% by weight based upon the weight of the dough.

In the present invention, it has been found that the at least one no-or low-gluten starchy material, the pregelatinized waxy starch, and the water when combined in the absence of any other of the dough ingredients should have a tackifier quality or tackifier value of at least about 2500, preferably at least about 3000, most preferably about 3400 to 4000 g-s (gram-seconds). The use of pregelatinized waxy starches and no-or low-gluten starchy materials which provide tackifier qualities within those ranges, provides doughs in accordance with the present invention which: 1) laminate acceptably as uniform, untorn, coherent sheets, 2) sheet and cut acceptably as uniform and extensible reduced sheets, and 3) expand and develop in the oven to result in products having a blistered chip-like appearance substantially throughout their surface.

The tackifier quality or value may be determined using a TA.XT2 4.3.7.3 ADHE adhesive test. The TA.XT2 texture analyser is a product of Stable Micro Systems, Surrey, England and is distributed by Texture Technologies Corp., Scarsdale, N.Y. The tackifier quality or value is the area under the negative peak in g-s. In this functionality test, a 12-mm diameter spherical probe is inserted into and then removed from the sample. The probe is moved at a speed of 0.2 mm/min., a force/load of 200g, and a compressive force duration of 0. The amount of force needed to remove the probe from the sample is a measure of the tackifier quality. Generally, the more force required to remove the probe, the greater is the amount of material remaining on the probe and the higher the tackifier quality of the sample. The sample may be formed by admixing the at least one starchy material, such as potato flakes, with the pregelatinized waxy starch, such as pregelatinized waxy corn starch, and water. The relative amounts of the starchy material and the pregelatinized waxy starch are preferably the same as the relative amounts used in forming the final dough. The weight of water used in the tackifier test is preferably equal to the weight of the starchy material used in the tackifier test. The three ingredients are combined at a temperature of less than 125° F. to obtain a homogeneous dough. The dough is separated into samples which are then subjected to testing.

For example, a test dough may be formed by dry mixing 5.00 gm of potato flakes and 0.95 gm of pregelatinized waxy maize starch for 3 minutes at 35° C. in a 50 ml jacketed mixograph bowl. Then, 5.00 gm of water are added to the dry blend and mixing is continued for another 3 minutes at 35° C. to obtain a dough. The dough is packed into a 10 ml cup and covered. The dough surface is flattened by applying thumb pressure to the cover. The sample is kept covered to maintain the temperature and prevent surface drying. The tackifier quality or tackifier value is determined two minutes after mixing ends.

A control dough may be made using only potato flakes and water by dry-mixing 5.00 gm of potato flakes for 3 minutes at 35° C., then adding 5.00 gm of water at 35° C. and mixing for three minutes.

The functionality of a given pregelatinized waxy starch or supply of a pregelatinized waxy starch may be evaluated from lot-to-lot using one constant lot of potato flakes. Likewise, one constant lot of pregelatinized waxy starch may be used for lot-to-lot evaluation of potato flakes.

For example, it has been found that for a given lot of potato flakes, a good quality pregelatinized waxy maize starch results in a tackifier quality value of 3000 to 4000 g-s, whereas a poor quality pregelatinized waxy maize starch results in a value of less than 1000 g-s when the weight ratio of potato flakes: pregelatinized waxy maize starch: water is 100:19:100. Without the pregelatinized waxy maize starch, the tackifier value is <100 g-s (potato flakes: pregelatinized waxy maize starch: water = 100:0:100).

It has been found that as the weight ratio of potato flakes on 80 mesh:on 40 mesh decreases, the functionally matched amount of pregelatinized waxy starch increases to obtain a given tackifier value. For example, to obtain a tackifier value of about 3400 g-s, the levels of X-Pand'R pregelatinized waxy maize starch and the approximate weight ratios of potato flakes on 80 mesh:on 40 mesh may be:

| Weight % of pre-gelatinized waxy maize starch based on 100 lbs. of potato flakes | Range for weight ratio of potato flakes on 80 mesh: on 40 mesh | Preferred weight ratio of potato flakes on 80 mesh: on 40 mesh |
|---|---|---|
| 0–17 | 1.3:1 to 2:1 | 1.7:1 |
| 18–22 | 0.8:1 to 1.2:1 | 1.1:1 |
| 23–40 | 0.45:1 to 0.7:1 | 0.6:1 |

One or more emulsifiers may be included in the doughs of the present invention to facilitate dough mixing, reduce dough stickiness, and facilitate machining. A preferred emulsifier for the production of potato-based snacks in accordance with the present invention is fluid, unbleached lecithin derived from the phosphatides of phospholipids of soybean oil. This fluid lecithin is an oil-based flowable liquid at room temperature and typically has a moisture content of less than or equal to about 1% by weight. Exemplary amounts of the fluidized lecithin or other emulsifiers may range from about 0.1% to about 0.7% by weight, based on the weight of the low- or no-gluten content starch material, such as potato flakes.

The chip-like snacks of the present invention may include conventional flavoring and leavening agents. Sugar may be included in the dough in amounts ranging up to about 12% by weight, preferably from about 2% to about 10% by weight, based upon the weight of the potato flakes or other no- or low-gluten content ingredient having starch. Salt may be added to the dough in an amount of up to about 5% by weight, based upon the weight of the potato flakes.

Exemplary leavening agents which may be used include sodium bicarbonate and calcium acid pyrophosphate. The one or more leavening agents may be used up to about 5% by weight, based upon the weight of the potato flakes or other starchy material. For example, calcium acid pyrophosphate may be used in amounts ranging from about 0.25 to about 2.0% by weight and the sodium bicarbonate may be used in amounts ranging from about 0.5% to about 1.5% by weight, based upon the weight of the potato flakes used to produce the machineable dough.

Conventional snack flavoring ingredients may be blended into the dough composition or sprinkled upon the dough composition before baking or applied to the product after baking. Exemplary flavoring ingredients which may be used include barbecue, sour cream, onion, garlic, bacon, chicken, beef, cheese, ham, peanut butter, nuts and seeds, vanilla, chocolate products, spices, and mixtures thereof. Corn germ may be included in flavor and texture modifying amounts. Corn germ is a by-product of milling corn and imparts a sweet flavor and crunchy texture to starchy snack food products. Exemplary amounts of the corn germ which may be used are up to about 20% by weight of the starch-containing ingredients.

The machineable doughs may be produced in accordance with the present invention at temperatures of less than about 125° F., preferably less than about 110° F. and most preferably at temperatures of about 100° F. to 105° F. At temperatures above about 105° F. dough stickiness tends to increase and may adversely affect lamination and sheetability. Ingredients may be added at 75° F. or above and mixed to form a dough without the application of external heat such as from steam injection or heating jackets. Heat generated by the mechanical mixing action in the mixer or heat provided by ingredients added at elevated temperatures may be used to maintain the dough temperature within a desired range. For example, water may be added at a temperature of about 120° F. to other ingredients which are at about 80° F. to obtain a final dough temperature in the range of about 100° F. to 105° F.

In forming the dough, the amount of pregelatinized waxy starch, such as pregelatinized waxy maize starch, which is functionally matched to the no- or low-gluten content starchy material according to the tackifier quality of the blend, is premixed with a portion of the no- or low-gluten content starchy material and a portion of the water to substantially uniformly hydrate the pregelatinized starch. For example, in embodiments of the present invention, in forming the preblend the weight ratio of the amount of pregelatinized waxy starch to the portion of the no- or low-gluten content starchy material may be from about 0.5:1 to about 5:1. The starchy material, such as the dehydrated potato flakes, competes with the pregelatinized waxy starch for the added water. If too much of the dehydrated potato is admixed with the pregelatinized waxy starch and water initially: insufficient hydration of the pregelatinized waxy starch tends to result, thereby adversely affecting machinability and tear resistance of the dough during lamination, dough sheet reduction, and transfer. If the amount of dehydrated potato admixed with the pregelatinized waxy starch is too low, the pregelatinized waxy starch tends to form lumps which are hydrated predominately on their surface. In the production of chip-like snacks of the present invention, the amount of the no- or low-gluten content starchy material, such as dehydrated potatoes, used to form the substantially homogeneous preblend may be from about 5% to about 30% by weight of the total amount of starchy material used to form the sheetable dough.

In forming the preblend, the pregelatinized waxy maize starch and the 5% to 30% by weight portion of the dehydrated potatoes, for example, are preferably blended together prior to addition of the water. The shortening or fat or oil, fluid lecithin, sugar, flavoring ingredients, and acid portion of the leavening agent may also be admixed with the pregelatinized waxy starch and dehydrated potatoes before admixing with the water. The amount of water added in forming the substantially homogeneous blend may range from about 30% to about 70% by weight of the total amount of added water.

The remaining portion of the no- or low-gluten content starchy material, such as dehydrated potatoes, and the remaining portion of the water may be admixed with the substantially homogeneous blend in one or more stages. Preferably, the remaining portion of the dehydrated potatoes is added in two stages. For example, about 40% to about 60% by weight of the remaining potato flakes may be added to the substantially homogeneous blend followed by addition of the remaining water. After mixing these ingredients to obtain substantial homogeneity, the remaining portion of the potato flakes may be added and admixed to obtain a substantially homogeneous dough wherein the pregelatinized waxy starch is substantially uniformly hydrated. The alkaline portion of the leavening agent, such as sodium bicarbonate, may be added with the dehydrated potatoes in the last stage.

The dough may be permitted to lay for up to about 90 minutes, preferably less than 30 minutes prior to machining.

Various machining processes can be used. Machining can include the processes used in standard cracker technology. Alternative machining processes include the use of a tortilla machine in which the dough-like composition is rolled and formed into pieces without being laminated.

In a preferred machining process, the dough is formed into a sheet by gauge or reduction rollers and enters a dough laminating machine. The laminating operation can be performed by overlapping lamina of about one-fourth inch thickness each such that one sheet is placed upon another. Typically, between 3 to 6 laminae are layered together during this operation. The laminate may be formed by folding the sheeted dough upon itself. Separate dough sheets may also be used to form a laminate.

The laminated dough-like composition is then reduced in thickness. Reduction of the dough mass is performed in stages. For example, after three laminae are formed into a sheet, the sheet may then be compressed to about one-sixteenth inch. For four laminae, the dough sheet may first be reduced in thickness to about ⅛" and then to about ¼". In either case, a final reduction in thickness is done by a gauge roller. The dough is reduced during this operation to a final thickness of about 1/32 of an inch. At this point, the sheet generally has a width to thickness ratio of at least about 350.

The machined dough-like composition is then cut into dough pieces. Cutting can be performed by a reciprocating cutter, a rotary cutter, or other dough cutting mechanisms. The cut dough pieces may be circular in shape, shaped like a potato slice, or any other desirable configuration. The circular dough piece may have a diameter of about 1¾ inches. For a potato slice configuration, the maximum length of the dough piece may range from about 2 inches to about 3.5 inches. The maximum width of the dough piece may range from about 1.25 to about 2.5 inches. Topping salt can be added at about 1% to 2% of the final product weight.

Dockering or piercing the uncut sheet or cut pieces can optionally be included in the machining operation. Each dough piece preferably contains from about 3 to about 6 docker holes. Dockering decreases the occurrence of "checking" or the formation of undesirable stress lines that cause breakage in the final product. The cut pieces may then be conveyed or transported to a convection oven for baking.

The dough sheeting, cutting, and dockering operations may occur at substantially the same dough temperatures and dough moisture content of the dough produced in the mixer. Thus, the dough pieces upon entering a baking oven may have a temperature of less than or equal to about 125° F., preferably less than or equal to about 110° F. and a dough moisture content of about 30% by weight to about 50% by weight. During the baking step, the dough moisture content is substantially reduced to form blistering over the surfaces of the baked pieces. The dough piece moisture content is preferably reduced from above about 30% by weight to preferably less than about 4% by weight during baking.

The dough pieces may be baked in conventional ovens, preferably a conventional gas-fired band oven having a plurality of temperature zones. The substantial reduction of the moisture content of the dough pieces in the baking oven causes the formation of curled configurations having blisters substantially throughout the surfaces of the baked piece. In addition, the substantial reduction in moisture content substantially reduces checking of the final product. Upon exiting the gas-fired band oven, the baked pieces most preferably have a moisture content of less than or equal to about 3.5% by weight and a temperature of about 190° F. to about 250° F. Exemplary baking temperatures range from about 220° F. to about 650° F. Baking times may range from about 2 minutes to about 7 minutes. The fast application of higher temperatures yields a rapid formation of steam within the dough pieces. Steam, present within the pieces, gives rise to blister formations as the pieces are being baked. The exterior portions of the pieces dry rapidly and trap steam formed in the internal portion of the pieces. As the steam forms under an external layer, it performs a function similar to the leavening agent and causes expansion of the dough-like composition.

After baking in the gas-fired oven, the dough pieces are preferably further dried by dielectric energy application which disperses the moisture present within the piece and decreases its total moisture. Preferably, the dielectric heating step reduces the moisture content to a level which is from about 0.5% to about 2% by weight lower. For example, if the moisture content leaving the gas-fired oven is about 2.3% to about 3.8% by weight, the dielectric heating may preferably reduce the moisture content of the pieces to about 1.3% by weight to about 1.8% by weight. In preferred embodiments of the present invention, the moisture content of the dough pieces leaving the dielectric oven is less than or equal to about 2% by weight. The dielectric heating tends to remove moisture from the areas of the dough piece having a higher moisture content thereby reducing moisture gradients within the piece which tend to cause checking.

In preferred embodiments, the dielectrically treated pieces are sprayed with oil to increase palatability and provide a medium for the adhesion of seasoning ingredients. In addition, the dielectrically heated pieces are preferably further subjected to moisture equilibration in an annealing tunnel at temperatures of from about 140° F. to about 180° F. Moisture reduction during annealing may range from about 0.2 to about 0.5%. The annealing step has been found to further reduce checking by about 4 to 7%.

After annealing, the oil-sprayed product may be subjected to tumbling for the addition of particulate seasoning ingredients. The moisture content of the products upon packaging is preferably from about 0.8 to about 2% by weight. The products are preferably packaged in vapor-proof packaging materials. The bulk density of the snack products of the present invention may range from about 6 to about 8 lbs. per cubic foot. The snack products of the present invention may contain the at least one starch ingredient, such as potato flakes or other no- or low-gluten content starchy material in an amount of at least 65% by weight, based upon the weight of the final product.

In other embodiments of the present invention, the dough pieces, after having their moisture content reduced to less than about 10%, preferably less than about 5%, most preferably less than about 3.5% by weight by heating in air, such as in a gas-fired oven, may be subjected to frying to enhance flavor while keeping the fat or oil content of the final product low.

The following examples illustrate the present invention wherein all parts, percentages, and ratios are by weight, and all temperatures are in ° F. unless indicated to the contrary:

EXAMPLE 1

The ingredients and their relative amounts used to prepare a cohesive, machineable dough for producing a low-fat content potato-based snack having a blistered, curled, potato-chip like appearance and chip-like texture were:

| INGREDIENTS | WEIGHT % BASED ON TOTAL DOUGH | PARTS BASED ON 100 LBS. POTATO FLAKES |
|---|---|---|
| STAGE 1 | | |
| Soybean oil | 1.41 | 3.03 |
| Fluid lecithin, unbleached | 0.15 | 0.32 |
| Sugar (sucrose) | 3.29 | 7.07 |
| Calcium acid pyrophosphate | 0.53 | 1.14 |
| X-Pand'R 287C pregelatinized waxy maize starch | 8.82 | 18.94 |
| Idaho Supreme potato flakes | 3.88 | 8.33 |
| STAGE 2 | | |
| Water | 19.40 | 41.67 |
| STAGE 3 | | |
| Idaho Supreme potato flakes | 19.40 | 41.67 |
| water | 19.40 | 41.67 |
| STAGE 4 | | |
| Idaho Supreme potato flakes | 23.28 | 50.00 |
| Sodium bicarbonate | 0.42 | 0.91 |
| Total | 100.0 | |
| Total added water | 38.8 | 83.33 |
| Total potato flakes | 46.57 | 100.0 |

The X-Pand'R 287C pregelatinized starch is a pregelatinized waxy maize starch produced by A.E. Staley Manufacturing Company. It has a moisture content of less than or equal to about 0.5% by weight and a pH of about 5.5 (+/−0.5). The particle size distribution of the X-Pand'R is about 20% maximum retained on a 50-mesh screen and about 30% maximum passing through a 200-mesh screen.

The Idaho Supreme potato flakes are ground dehydrated potato flakes which are completely gelatinized as determined by Differential Scanning Calorimetry. They are produced by Idaho Supreme Potatoes, Inc., Firth, Id. 83236 from Russet Burbank potatoes grown in Idaho. The potatoes are fully peeled, trimmed, and then precooked, cooled, cooked again, dried, and then ground. The Idaho Supreme potato flakes have a sodium acid pyrophosphate content of about 800 ppm. (+/−200 ppm.), a maximum moisture content of about 7.5% by weight, an emulsifier content (monoglyceride derived from vegetable oil) of about 0.5% by weight (+/−0.1%), a citric acid content of less than or equal to about 100 ppm., and a maximum reducing sugar (as dextrose) content of about 2.5% by weight. The Idaho Supreme potato flakes have a particle size distribution of about 12% maximum retained on a 20-mesh screen, about 45% by weight (+/−10%) retained on a 40-mesh screen, about 35% by weight (+/−10%) retained on an 80-mesh screen, and a maximum of about 13% by weight passing through an 80-mesh screen.

The fluid lecithin is an unbleached lecithin derived from the phosphatides of phospholipids of soybean oil. It is an oil-based product which is pourable at room temperatures. Its Brookfield viscosity at 77° F. is about 5500 (+/−200) cps. The moisture content of the fluid lecithin is no more than 1% by weight and its acetone insoluble matter (phosphatides) is at least 62% by weight. The hexane-soluble matter is 0.3% by weight maximum.

In Stage 1, the soybean oil and the fluid lecithin are premixed and then poured into an upright dough mixer. A preblend of the sucrose and calcium acid pyrophosphate is then added to the mixer. The pregelatinized starch followed by the Stage 1 portion of the potato flakes are then added to the mixer. The weight ratio of the pregelatinized starch to the potato flakes used in this first mixing stage is about 2.27:1. The amount of potato flakes used in the Stage 1 mixing step is about 8.33% by weight of the total amount of potato flakes used to form the final or finished dough. These ingredients are mixed about one minute to form a substantially homogeneous blend.

In the second mixing stage, water at a temperature of about 95° F. to 105° F. is added to the dough mixer and admixed with the substantially homogeneous blend for about 3 minutes to uniformly hydrate the pregelatinized starch and to obtain a substantially homogeneous blend. The amount of water added in this stage is about 50% by weight of the total amount of added water used to form the finished or final dough.

In the third mixing step, an additional portion of the potato flakes are added to the dough mixer followed by the addition of the remaining water. The temperature of the added water is about 95° F. to about 105° F. The ingredients are mixed for about three minutes to obtain a substantially homogeneous mixture. The amount of potato flakes used in this stage is about 41.7% by weight, based upon the total amount of potato flakes used to form the final or finished dough. The amount of added water in this stage is about 50% by weight of the total amount of added water used to form the machineable dough.

In the fourth mixing stage, the remaining portion of the potato flakes are added to the dough mixer followed by addition of the sodium bicarbonate. The amount of potato flakes used in this stage is about 50% by weight of the total amount of potato flakes used to produce the dough. Mixing is continued for about an additional four to eight minutes to uniformly hydrate the potato flakes and to form a cohesive, homogeneous machineable dough. On a calculated basis, the moisture content of the dough (which includes the moisture present in the ingredients as well as the added water of Stages 2 and 3) is about 41% to about 43% by weight, based upon the total weight of the dough.

In the four mixing stages, the ingredients are mixed in an open vessel at atmospheric pressure without external heating to obtain a final dough temperature of about 98° to 108° F. The dough is then transferred to conventional reduction rollers to form a continuous sheet of about ¼ inch in thickness. The sheet is laminated in a conventional cracker dough laminating machine. The laminator cuts the sheet dough and layers the cut sheets to obtain a laminate of four laminae. The four layer laminate is then reduced in thickness in three stages to a thickness of about 1/32 inch using reduction rollers. The first stage of rollers reduces the laminate thickness to about ½ inch. The second stage of rollers reduces the thickness to about ¼ inch. The last stage of rollers reduces the dough sheet thickness from about ¼ inch to the final 1/32 inch.

The laminate is then cut into circular shaped pieces using a rotary cutter. The scrap is removed and the pieces are then conveyed through a conventional gas-fired band oven having a plurality of temperature zones. The rotary cutter also imparts five dockering holes per dough piece. Upon entry into the oven, the dough pieces still have a moisture content of about 41% to about 43% by weight. The band temperature may range from about 310° F. to about 330° F. and the baking time may range from about 2.5 minutes to about 3.0 minutes.

The residence time of the pieces in the oven may be about 3 minutes for baking the pieces to a moisture content of less than about 2.5% by weight and a water activity of about 0.7. Upon exiting the gas-fired oven, the temperature of the pieces may be about 220° F. The exiting pieces have a blistered, curled chip-like appearance.

The thus baked product may then be transferred to a dielectric oven which may reduce the moisture content of the pieces by about 0.5%, that is to a moisture content of less than or equal to about 2%. The dielectrically heated product is then transferred to a tunnel where it is sprayed with oil. The sprayed product may then be transferred to an annealing tunnel to equilibrate its moisture and to reduce the moisture content by about 0.2% to about 0.4%, that is to a moisture content of less than about 1.8%. Upon exiting the annealing tunnel, the temperature may be about 165° F. The annealed product may then be transferred to a tumbler for the addition of particulate seasoning ingredients. The seasoned product may then be transferred to a packaging operation for packaging in moisture proof bags. The final oil-sprayed product may have an oil content of about 14.5% to about 19.5% by weight, based upon the weight of the final product.

EXAMPLE 2

A potato-chip like product may be produced as in Example 1 except the Idaho Supreme dehydrated potatoes may be replaced by a 50:50 blend of the Idaho Supreme dehydrated potatoes and dehydrated potato flakes produced by Idaho Pacific such that a tackifier test dough made from 50 parts of the Idaho Supreme dehydrated potato flakes, 50 parts of the Idaho Pacific potato flakes, 100 parts of water and 18.94 parts of the X-Pand'R pregelatinized waxy maize starch has a tackifier value of about 3400 to 4000 g-s.

EXAMPLE 3

A potato-chip like product may be produced as in Example 1 except the moisture content of the dough pieces may be reduced to less than about 5% by weight in the gas-fired oven and then the dough pieces may be fried in a conventional fryer to obtain a crisp potato-chip like product having an oil content of less than about 20% by weight.

What is claimed is:

1. A method for the production of a chip-like snack comprising:
   a) forming a machineable dough at a temperature of less than about 125° F. by admixing ingredients comprising a no- or low-gluten content starchy material, water, and about 4% by weight to about 40% by weight of a pregelatinized waxy starch, said weight percentage being based upon the weight of said starchy material, wherein a portion of said starchy material and a portion of the water are premixed with the pregelatinized waxy starch to substantially uniformly hydrate the pregelatinized waxy starch, and the remaining portion of said starchy material and the remaining portion of the water are admixed with the hydrated pregelatinized waxy starch to obtain said dough,
   b) sheeting the dough,
   c) cutting the sheeted dough into pieces having a moisture content of from about 25% by weight to about 60% by weight, and d) heating said pieces to reduce said moisture content to less than about 4% by weight to obtain pieces having a blistered appearance substantially throughout their surface.

2. A method as claimed in claim 1 wherein said pregelatinized waxy starch is a pregelatinized waxy maize starch and said starchy material comprises dehydrated potatoes.

3. A method as claimed in claim 2 wherein said pieces are heated in air to reduce their moisture content to less than 10% by weight, and then fried to further reduce their moisture content.

4. A method as claimed in claim 2 wherein said pieces have a moisture content of from about 30% to about 50% by weight, and the pieces are baked to reduce said moisture content to less than 4% by weight.

5. A method as claimed in claim 1 wherein said starchy material comprises corn masa and said pregelatinized waxy starch comprises a pregelatinized waxy maize starch.

6. A method as claimed in claim 1 wherein said starchy material comprises corn flour, oat flour, and rice flour.

7. A method as claimed in claim 1 wherein said pregelatinized waxy starch comprises a pregelatinized waxy rice starch.

8. A method as claimed in claim 1 wherein said pregelatinized waxy starch comprises a pregelatinized waxy rice starch and a pregelatinized waxy maize starch.

9. A method as claimed in claim 8 wherein said starchy material comprises corn masa.

10. A method as claimed in claim 2 wherein said dehydrated potatoes are essentially completely gelatinized as measured by differential scanning calorimetry.

11. A method for the production of a chip-like snack comprising:
   a) admixing pregelatinized waxy starch, dehydrated potatoes, and water to substantially, uniformly hydrate the pregelatinized waxy starch and obtain a substantially homogeneous blend, the weight ratio of the amount of pregelatinized waxy starch to the amount of dehydrated potato being from about 0.5 to about 5.0:1,
   b) admixing said blend with additional water and additional dehydrated potatoes to obtain a machineable dough having a moisture content of from about 30% by weight to about 55% by weight, the amount of dehydrated potatoes used in step (a) being from about 5% to about 30% by weight of the total amount of dehydrated potatoes,
   c) sheeting the dough,
   d) cutting the sheeted dough into pieces, and
   e) heating the dough pieces to reduce their moisture content and obtain chip-like products having a blistered appearance and a crisp texture.

12. A method as claimed in claim 11 wherein in step (a) the pregelatinized waxy starch and the dehydrated potatoes are blended and then admixed with the water to form said substantially homogeneous blend.

13. A method as claimed in claim 11 wherein said machineable dough is obtained at a temperature of less than about 110° F.

14. A method as claimed in claim 11 wherein said dehydrated potatoes are dehydrated potato flakes.

15. A method as claimed in claim 14 wherein the starch of said potato flakes is essentially completely gelatinized.

16. A method as claimed in claim 11 wherein said pregelatinized starch is pregelatinized waxy maize starch.

17. A method as claimed in claim 15 wherein said potato flakes have a particle size distribution such that the weight ratio of potato flakes retained on an 80-mesh screen to potato flakes retained on a 40 mesh screen is from about 0.45:1 to about 2.0:1.

18. A method as claimed in claim 11 wherein in step (a) the pregelatinized starch and dehydrated potatoes are admixed with shortening or fat, fluid lecithin, and at least one sugar, and then admixed with the water to form said substantially homogeneous blend.

19. A method as claimed in claim 11 wherein said dough is laminated upon itself and then sheeted.

20. A method as claimed in claim 11 wherein said dough is formed into a sheet having a thickness of about 1/32" of an inch.

21. A method as claimed in claim 11 wherein said heating comprises reducing the moisture content of said pieces to less than about 4% by weight in a gas-fired oven to obtain baked pieces having a blistered appearance.

22. A method as claimed in claim 21 wherein said baked pieces are subjected to dielectric heating to further reduce the moisture content of the pieces and reduce checking of the pieces.

23. A method as claimed in claim 22 wherein the baked pieces are annealed to equilibrate moisture after said dielectric heating.

24. A method for the production of a chip-like snack comprising:
   a) admixing ingredients comprising at least one no- or low-gluten content starchy material, up to about 40% by weight of at least one pregelatinized waxy starch, based upon the weight of the starchy material, and water to form a dough having a moisture content of about 25% to about 60% by weight at a temperature of less than about 125° F., wherein said pregelatinized waxy starch, said starchy material and said water form a tackifier test dough having a tackifier quality of at least about 2500 g-s,
   b) sheeting the dough,
   c) cutting the sheeted dough into pieces, and
   d) heating the dough pieces to reduce their moisture content and obtain chip-like products having a blistered appearance and a crisp texture.

25. A method as claimed in claim 24 wherein said tackifier quality is about 3400 to about 4000 g-s.

26. A method as claimed in claim 24 wherein said at least one starchy material is dehydrated potato flakes having a particle size distribution such that the weight ratio of the amount of potato flakes retained on an 80 mesh screen to the amount of potato flakes retained on a 40 mesh screen is about 0.8–1.2:1.

27. A method as claimed in claim 26 wherein the pregelatinized waxy starch is a pregelatinized waxy maize starch.

28. A method as claimed in 26 wherein the amount of pregelatinized starch is about 17% to about 23% by weight, based upon the weight of the potato flakes.

* * * * *